US005290646A

United States Patent [19]

Asao et al.

[11] Patent Number: 5,290,646

[45] Date of Patent: Mar. 1, 1994

[54] BATTERY TERMINAL

[75] Inventors: Tadayoshi Asao; Nori Inoue; Kazumoto Konda, all of Yokkaichi, Japan

[73] Assignee: Sumito Wiring Systems, Ltd., Yokkaichi, Japan

[21] Appl. No.: 75,891

[22] Filed: Jun. 14, 1993

[30] Foreign Application Priority Data

Jun. 17, 1992 [JP] Japan ............................ 4-041571[U]

[51] Int. Cl.$^5$ ........................ H01M 2/02; H01M 2/30

[52] U.S. Cl. ...................................... 429/178; 429/179

[58] Field of Search ................................ 429/178, 179

[56] References Cited

U.S. PATENT DOCUMENTS 2,019,823 11/1935 Lewis ................................. 429/178

3,973,820 8/1976 Benson .

4,062,613 12/1977 Tritenne .

FOREIGN PATENT DOCUMENTS 2725422 3/1978 Fed. Rep. of Germany ...... 429/178

2582447 11/1986 France .

4-7567 2/1992 Japan .

4-9736 3/1992 Japan .

418042 10/1934 United Kingdom ................ 429/178

*Primary Examiner*—John S. Maples

*Attorney, Agent, or Firm*—Sandler Greenblum & Bernstein

[57] ABSTRACT

A battery terminal comprising first and second tightening plates continuous with an open free end of an annular electrode-engaging portion into which a battery post is inserted; and an electric wire-connecting portion continuous with the first tightening plate or the second tightening plate or the electrode-engaging portion, in which the first tightening plate is moved toward the second tightening plate to close the free end of the electrode-engaging portion so that the battery terminal is fixed to the battery post. In the above construction, a nut is tightened downward on the bolt to move the sliding contact portion downward along the inclined portion so that the first tightening plate is moved toward the second tightening plate.

4 Claims, 6 Drawing Sheets

BATTERY TERMINAL

BACKGROUND OF THE INVENTION

1. Field of the Invention

The present invention relates to a battery terminal to be installed on an electrode (battery post) of a battery mounted on an automobile or the like and more particularly to the battery terminal which can be installed on the battery post downward and vertically.

2. Description of the Related Arts

As shown in FIG. 10, a battery post 2 projecting upward from the upper surface of a battery 1 is inserted into an electrode-engaging portion 3*a* of a battery terminal 3. A bolt 4 is horizontally inserted into a bolt opening of a substrate 3*b* and that of a tightening plate 3*c*. A nut 6 is tightened horizontally on the bolt 4 with an impact wrench 5 disposed horizontally. Then, the electrode-engaging portion 3*a* is pressed against the battery post 2 to fix the battery terminal 3 to the battery post 2.

In recent years, parts are installed in the engine room of the automobile in a high density. For example, a projections such as an air duct higher than the battery post 2 or electric wires are installed in the periphery of the battery 1. In tightening the nut 6 on the bolt 4, with the bolt 4 and the impact wrench 5 disposed horizontally, the following problems occur: The impact wrench 5 may contact other parts and thus it is difficult to tighten the nut 6 on the bolt 4 or it is impossible to tighten the nut 6 thereon if there is no space in which the impact wrench 5 is placed horizontally.

If the impact wrench 5 and other parts interfere with each other while the plus side of the battery post is being tightened, a short circuit occurs when the impact wrench 5 interferes with the minus side thereof. Even a fire may occur in the automobile. Therefore, it is necessary to alter the configurations of other parts so as to prevent the interference between the impact wrench 5 and other parts.

In order to overcome the above-described problems, the following battery terminal is disclosed in Examined Japanese Utility Model Publication No. 4-7567 as shown in FIG. 11: That is, the bolt 4 is inclined at an acute angle with respect to the axis of the electrode-engaging portion 3*a* of the battery terminal 3, and the nut 6 is tightened diagonally downward toward the head of the bolt 4 by the impact wrench 5.

The following battery terminal is also disclosed in Examined Japanese Utility Model Publication No. 4-9736 as shown in FIGS. 12A and 12B: That is, the battery terminal comprises a substrate 3*b*'; a tightening plate 3*c*' opposed to each other and inversely tapered; and a crimping plate 7 inversely tapered and stretching over the substrate 3*b*' and the tightening plate 3*c*'. The bolt 4 is tightened downward on the crimping plate 7 so that the crimping plate 7 presses the substrate 3*b*' and the tightening plate 3*c*' downward In this manner, an electrode-engaging portion 3*a*' is pressed against the battery post 2.

In the battery terminal as shown in FIG. 11, since the nut 6 is tightened downward diagonally, the substrate 3*b* and the tightening plate 3*c* are formed by imparting torsion thereto so that they incline with respect to the axial direction of the electrode-engaging portion 3*a*. The direction in which the twisted substrate 3*b* and the tightening plate 3*c* are moved toward each other is different from the direction in which the electrode engaging portion 3*a* is pressed against the peripheral surface of the battery post 2. Therefore, the force generated by the nut 6 tightened on the bolt 4 cannot be preferably applied to the direction in which the electrode-engaging portion 3*a* is pressed against the peripheral surface of the battery post 2.

In the battery terminal as shown in FIG. 12, both sides of the crimping plate 7 are inversely tapered. As a result, the force generated by the nut 6 tightened on the bolt 4 acts outward as well as inward and thus, the sides 7*a* and 7*b* of the crimping plate 7 do not preferably apply tightening force inward to the substrate 3*b*' and the tightening plate 3*c*'. As a result, there is a disadvantage that the electrode-engaging portion 3*a*' cannot be reliably pressed against the battery post 2.

SUMMARY OF THE INVENTION

It is an object of the present invention to provide a battery terminal in which an electrode-engaging portion can be reliably pressed against a battery post by preventing an impact wrench from interfering with other parts and converting the force applied downward by the nut tightened on the bolt into a horizontal direction so as to move a free end of the electrode-engaging portion in the direction in which the free end is closed.

In accomplishing the objects of the present invention, there is provided a battery terminal comprising first and second tightening plates continuous with an open free end of an annular electrode-engaging portion into which a battery post is inserted; and an electric wire-connecting portion continuous with the first tightening plate or the second tightening plate or the electrode-engaging portion, in which the first tightening plate is moved toward the second tightening plate to close the free end of the electrode-engaging portion so that the battery terminal is fixed to the battery post.

In the above construction, a tightening strip disposed above the second tightening plate is formed on the first tightening plate integrally or continuously therewith; an elongated groove is formed on the tightening strip in the direction in which the first tightening plate is moved toward the second tightening plate; a sliding contact portion is formed at an end of the tightening strip in the longitudinal direction of the elongated groove; a tightening substrate is formed integrally with the second tightening plate; a bolt is installed upward on the tightening substrate through the elongated groove; and an inclined portion along which the sliding contact portion slides is formed integrally with the tightening substrate.

In the above construction, a nut is tightened downward on the bolt to move the sliding contact portion downward along the inclined portion so that the first tightening plate is moved toward the second tightening plate.

The first and second tightening plates extend horizontally from the free end of the electrode-engaging portion; the first tightening plate inclines upward from the free end; and the tightening strip disposed above the second tightening plate is formed integrally with an end of the first tightening plate via a stepped portion.

The first and second tightening plates each consisting of a flat plate vertically extending are opposed to each other; the tightening substrate extends beyond the lower end of the first tightening plate; the inclined portion opposed to the first tightening plate is formed at the end of the tightening substrate; the tightening strip separate from the first and second tightening plate is disposed above the tightening substrate with an end of the tightening plate in contact with the first tightening plate and the other end thereof in contact with the inclined portion; and the nut is tightened on the bolt projecting upward through the tightening substrate and the elongated groove formed on the tightening strip.

The bolt is installed on the tightening substrate (second tightening plate) by inserting the bolt upward through a bolt opening formed on the tightening substrate (second tightening plate) so as to lock the head of the bolt by a locking strip projecting downward from the tightening substrate (second tightening plate) in tightening the nut on the bolt.

A stud bolt may be inserted into the bolt opening and the flat head of the stud bolt in contact with the lower surface of the tightening substrate (second tightening plate) is welded onto the lower surface thereof.

According to the above construction, the free end of the electrode-engaging portion is open before the battery terminal is installed on the battery post. Therefore, the electrode-engaging portion can be easily installed on the battery post.

Thereafter, the nut is tightened downward on the bolt vertically disposed. As a result, the sliding contact portion of the tightening strip moves downward along the inclined portion of the tightening substrate and the elongated groove of the tightening strip is moved along the bolt. In this manner, the tightening strip moves downward and horizontally. That is, the tightening force, generated by the tightening of the nut on the bolt, acting downward is divided into the force acting in the direction in which the first tightening plate moves toward the second tightening plate and the force acting in the downward direction. As a result, the first tightening plate continuous with the tightening strip is moved to the second tightening plate. That is, the electrode-engaging portion of the battery terminal is moved in the closing direction thereof and thus can be pressed securely against the peripheral surface of the battery post and fixed thereto.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
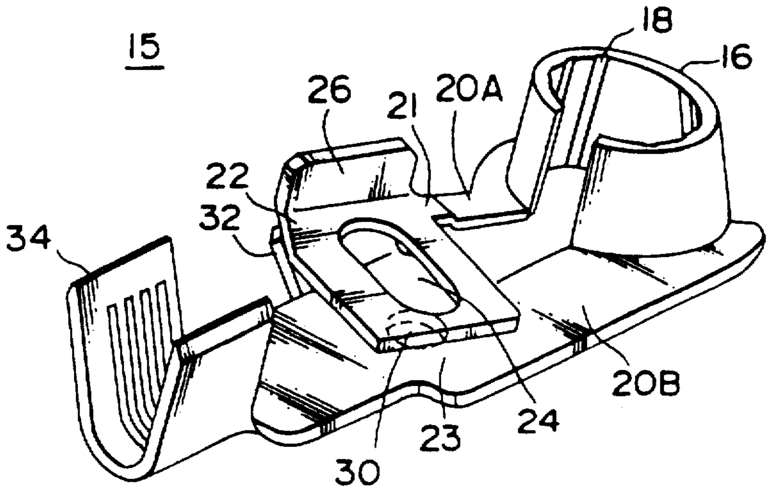
FIG. 1 is a perspective view showing a battery terminal according to a first embodiment of the present invention.

Before the description of the present invention proceeds, it is to be noted that like parts are designated by like reference numerals throughout the accompanying drawings.

A battery terminal according to the embodiments of the present invention will be described below with reference to the drawings.

A battery terminal 15 according to the first embodiment of the present invention will be described below with reference to FIGS. 1 through 4. As shown in FIG. 1, a metal sheet is punched and bent to form the battery terminal 15 in an integral construction.

The battery terminal 15 comprises an annular electrode-engaging portion 16 formed at the forward end thereof and a free end formed at the rear end thereof.

The electrode-engaging portion 16 has a groove 18, formed vertically on the inner surface thereof, which contacts a battery terminal inserted thereinto so that the groove 18 allows the electrode-engaging portion 16 to be flexible. In this manner, the battery terminal 15 can be pressed against the battery post.

Flat plates are projected from each free end of the electrode-engaging portion 16 formed at the lower end thereof to form a first tightening plate 20A and a second tightening plate 20B.

More specifically, the first tightening plate 20A disposed in the left side in FIG. 1 inclines upward from the free end of the electrode-engaging portion 16, and the second tightening plate 20B disposed in the right side in FIG. 1 is horizontally.

A tightening strip 22 is formed integrally with the first tightening plate 20A via a stepped portion 21 formed in the thickness of the first tightening plate 20A at the rear end of the first tightening plate 20A. A tightening substrate 23 is formed integrally with the second tightening plate 20B in the rear end thereof. The tightening strip 22 and the tightening substrate 23 are in the same rectangular configuration. The tightening strip 22 projects in the direction from the first tightening plate 20A toward the second tightening plate 20B while the tightening substrate 23 projects in the direction from the second tightening plate 20B toward the first tightening plate 20A so that the tightening strip 22 is disposed above the tightening substrate 23.

The tightening strip 22 has in the center thereof an elongated groove 24, the longer side of which corresponds to the direction in which the first tightening plate 20A is moved toward the second tightening plate 20B. A sliding contact portion 26 is formed at the left end of the tightening strip 22 in FIG. 1. The sliding contact portion 26 is upward and almost perpendicular to the tightening strip 22.

Figure 2:
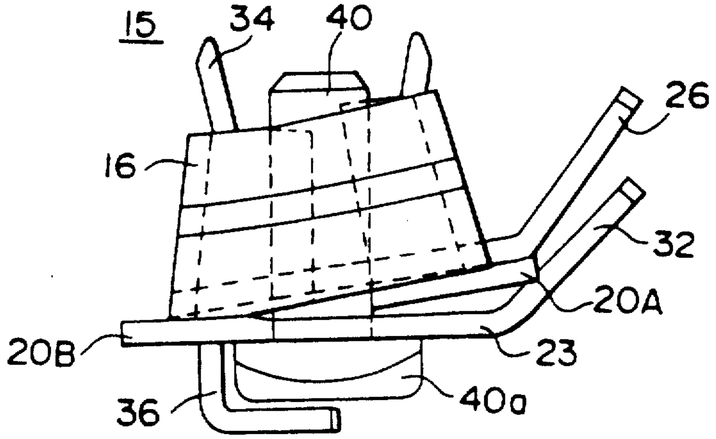
FIG. 2 is a front view showing the battery terminal according to the first embodiment of the present invention.

An inclined portion 32 consisting of a flat plate is formed integrally with the tightening substrate 23 on the left end of the tightening substrate 23. The inclined portion 32 inclines outward and upward from the tightening substrate 23 as best shown in FIG. 2. In this embodiment, the inclined portion 32 forms approximately 30° with the tightening substrate 23, but it may form an angle other than 30°.

The lower surface of the sliding contact portion 26 contacts the upper portion of the inclined portion 32.

A bolt opening 30 is formed on the tightening substrate 23 at a position corresponding to the right end of the elongated groove 24 in FIG. 1. As shown in FIG. 2, a bolt 40 is penetrated upward through the bolt opening 30 and the elongated groove 24 disposed above the tightening substrate 23 so as to project the bolt 40 from the upper surface of the elongated groove 24.

The head 40*a* of the bolt 40 is locked on the lower surface of the tightening substrate 23 by a locking strip 36 projecting downward from the lower surface of the tightening substrate 23.

An electric wire-connecting substrate 34 is provided in connection with the rear end of the tightening substrate 23. The electric wire-connecting substrate 34 is barrel-shaped and the connecting portion thereof is crimped with electric wires inserted therethrough.

Figure 3:
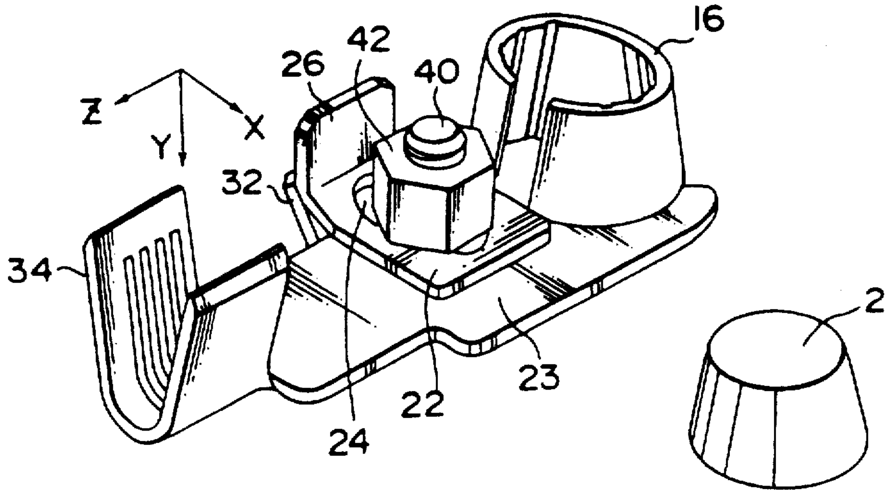
FIG. 3 is an explanatory view showing an operation for installing the battery terminal, on a battery post, according to the first embodiment of the present invention.

In the battery terminal 15, a nut 42 is tightened downward on the bolt 40 projecting upward from the bolt opening 30 so as to fix the tightening strip 22 to the tightening substrate 23 temporarily as shown in FIG. 3.

Figure 4:
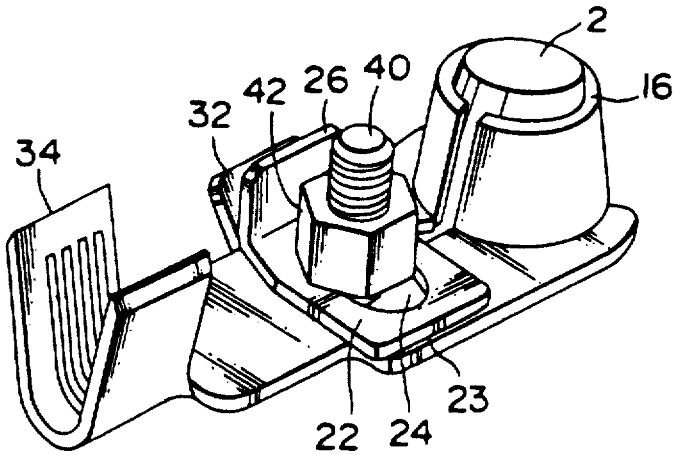
FIG. 4 is a perspective view showing the state in which the battery terminal according to the first embodiment of the present invention has been fixed to the battery post.

An operation for installing the battery terminal 15 on the battery post is described below with reference to FIGS. 3 and 4.

A battery post 2 of a battery 1 is inserted into the electrode-engaging portion 16 of the battery terminal 15 in which the tightening strip 22 has been temporarily fixed to the tightening substrate 23. The nut 42 is tightened downward (Y-direction) on the tightening strip 22 by means of an impact wrench as shown in FIG. 3. As a result, the nut 42 moves downward, thus pressing the tightening strip 22 downward.

The inclined portion 32 in contact with the tightening strip 22 moving downward divides the tightening force acting in Y-direction into X-direction and Y-direction. That is, the inclined portion 32 serves as a means for moving the tightening strip 22 toward the right (direction toward the second tightening plate 20B). At this time, the elongated groove 24 moves along the bolt 40. As a result of the movement of the tightening strip 22 toward the right, the first tightening plate 20A integral with the tightening strip 22 moves toward the right. In this manner, the free end of the electrode-engaging portion 16 moves in the closing direction thereof and as a result, the electrode-engaging portion 16 tightens the battery post 2. Thus, the battery terminal 15 is fixed to the battery post 2 as shown in FIG. 4.

Figure 5:
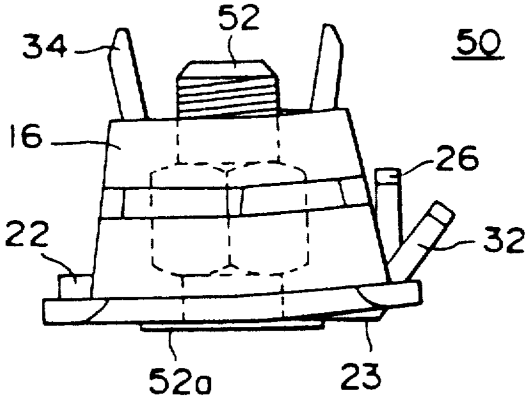
FIG. 5 is a front view showing a battery terminal according to a second embodiment of the present invention.
Figure 6:
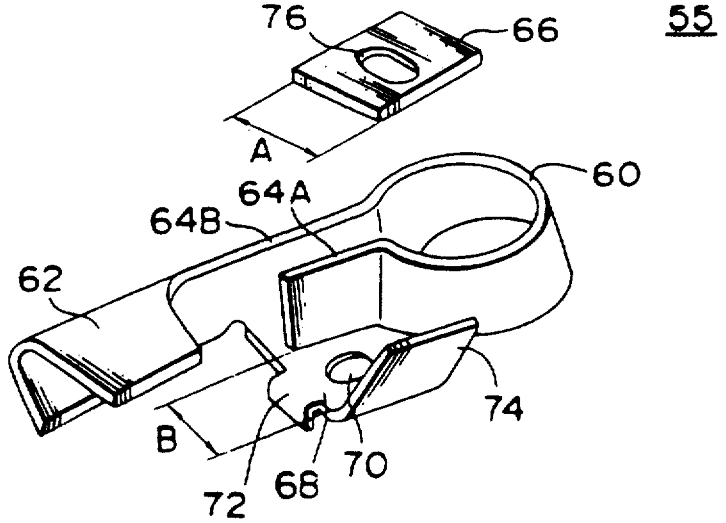
FIG. 6 is a perspective view showing a battery terminal according to a third embodiment of the present invention.
Figure 7:
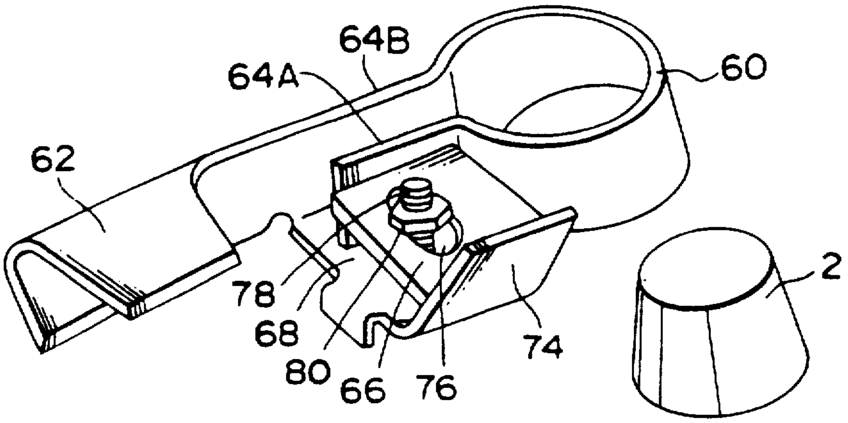
FIG. 7 is an explanatory view showing an operation for installing the battery terminal, on the battery post, according to the third embodiment of the present invention.

A battery terminal according to the second embodiment of the present invention will be described below with reference to FIG. 5. A bolt 52 of a battery terminal 50 according to the second embodiment is a stud bolt projecting upward through a bolt opening.

The flat head 52*a* of the stud bolt 52 is welded onto the lower surface of the tightening substrate 23. Unlike the first embodiment, in the second embodiment, the bolt head 52*a* does not project upward from the lower surface of the battery terminal 50 and a bolt locking strip is not formed on the lower surface of the tightening substrate 23. Thus, the battery terminal 50 is flat.

Since the constructions of the other members and the operation for installing the battery terminal 50 on the battery post are similar to those of the first embodiment, the descriptions thereof are omitted herein.

A battery terminal according to the third embodiment of the present invention will be described below with reference to FIGS. 6 through 9. In the third embodiment, a tightening strip 66 is formed separately from a first tightening plate 64A or a second tightening plate 64B.

Similarly to the first embodiment, a battery terminal 55 according to the third embodiment comprises an electrode-engaging portion 60 formed in the forward end thereof. A metal sheet is bent in an annular configuration to form the electrode-engaging portion 60 which is open in the rear end thereof. The first tightening plate 64A and the second tightening plate 64B each consisting of a flat plate extending vertically are formed integrally with each free end of the electrode-engaging portion 60.

The lower end of the second tightening plate 64B disposed on the left side of the battery terminal 55 is bent toward the first tightening plate 64A disposed on the right side of the battery terminal 55 so as to form a tightening substrate 68 consisting of a flat plate. The tightening substrate 68 extends toward the right in FIG. 6 in the length of (B) beyond the lower surface of the first tightening plate 64A.

The tightening substrate 68 has a bolt opening 70 formed at a position located beyond the lower surface of the first tightening plate 64A. A bolt 78 is inserted upward into the bolt opening 70. A locking strip 72 projects downward from the rear end of the tightening substrate 68 so that the locking strip 72 locks the bolt 78.

The right end of the tightening substrate 68 is bent upward at an acute angle with respect to the tightening substrate 68 so as to form an inclined portion 74 opposed to the first tightening plate 64A.

An electric wire-connecting substrate 62 is formed integrally with the rear end of the second tightening substrate 64B. The electric wire-connecting substrate 62 is barrel-shaped and the connecting portion thereof is crimped with electric wires inserted therethrough.

The rectangular tightening strip 66 separate from the first and second tightening plates 64A and 64B is disposed above the tightening substrate 68 with the tightening strip 66 sandwiched between the first tightening plate 64A and the inclined portion 74. That is, an end of the rectangular tightening strip 66 is in contact with the outer surface of the first tightening plate 64A and the other end thereof is in contact with the inclined portion 74 opposed to the first tightening plate 64A. The shorter side (length A shown in FIGS. 6 and 8) of the rectangular tightening strip 66 is longer than the length (B), of the tightening substrate 68, in the range between the first tightening plate 64A and the inclined portion 74.

An elongated groove 76 is formed on the tightening strip 66 in the direction from a position corresponding to the left end of the bolt opening 70 toward the inclined portion 74.

The bolt 78 is inserted upward through the bolt opening 70 and the elongated groove 76 and then, a nut 80 is tightened downward on the bolt 78 so as to temporarily fix the tightening strip 66 to the tightening substrate 68.

Figure 9A:
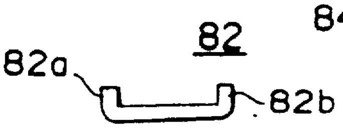
FIG. 9A to 9C, is a plan view showing modifications of a tightening strip according to the third embodiment of the present invention.
Figure 9B:
Figure 9C:
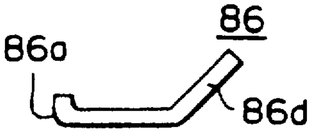
Figure 10:
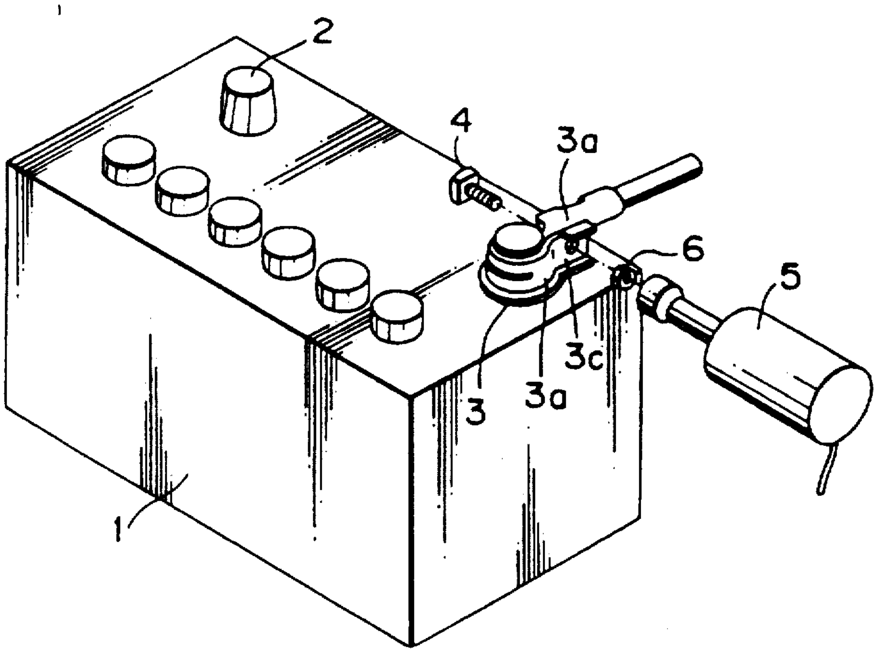
Fig. 10 PRIOR ART
FIG. 10 is a perspective view showing the state in which a conventional battery terminal has been fixed to the battery post.
Figure 11:
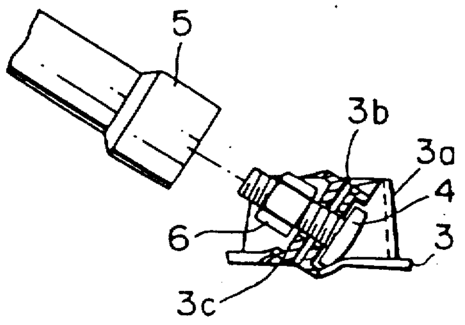
Fig. 11 PRIOR ART
FIG. 11 is a plan view showing the state in which another conventional battery terminal has been fixed to the battery post.
Figure 12A:
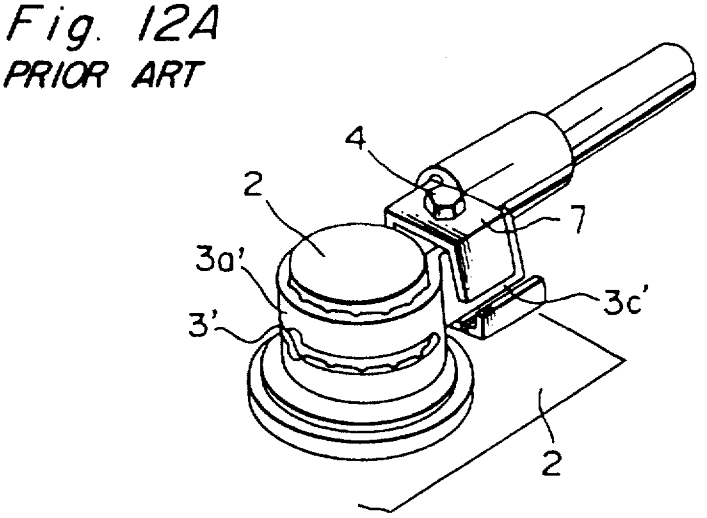
Fig. 12A PRIOR ART
FIG. 12A and 12B is a plan view showing the state in which still another conventional battery terminal has been fixed to the battery post.
Figure 12B:
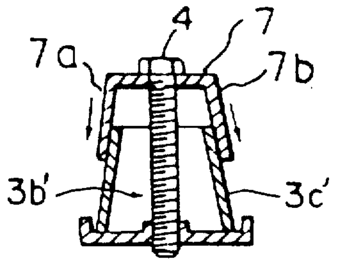
Fig. 12B PRIOR ART

The tightening strip 66 may be formed in the configurations as shown in FIGS. 9A, 9B, and 9C.

As shown in FIG. 9A, a tightening strip 82 comprises a sliding contact portion 82*a* which is brought in contact with the first tightening plate 64A and a sliding contact portion 82*b* which is brought in contact with the inclined portion 74. The sliding contact portions 82*a* and 82*b* are perpendicular to the bottom surface of the tightening strip 82. As shown in FIG. 9B, a tightening strip 84 comprises a sliding contact portion 84*a* which is brought in contact with the first tightening plate 64A and a sliding contact portion 84*b* which is brought in contact with the inclined portion 74. The sliding contact portion 84*a* and 84*b* are upward and form an acute angle with the bottom surface of the tightening strip 84, respectively. The sliding contact portions 82*a*, 82*b*, 84*a*, and 84*b* are formed to prevent the tightening substrate 68 from inclining in tightening the nut 80 on the tightening strips 82 and 84.

As shown in FIG. 9C, a tightening strip 86 comprises a sliding contact portion 86*a* which is brought in contact with the first tightening plate 64A and a sliding contact portion 86*d* which is brought in contact with the inclined portion 74. The sliding contact portion 86*a* is perpendicular to the bottom surface of the tightening strip 86. The sliding contact portion 86*d* is upward and forms an acute angle, with the bottom surface of the tightening strip 86, which is equal to the angle formed between the inclined portion 74 and the tightening substrate 68. In this manner, the bottom surface of the tightening strip 86 and sliding contact portion 86*d* are parallel with the tightening substrate 68 and the inclined portion 74, respectively.

Needless to say, the bolt 78 to be installed on the battery terminal 55 according to the third embodiment may be a stud bolt, similarly to the bolt 52 according to the second embodiment.

An operation for installing the battery terminal 55 on the battery post 2 is described below.

The battery post 2 of the battery 1 is inserted into the electrode-engaging portion 60 of the battery terminal 55 in which the tightening strip 66 has been temporarily fixed to the tightening substrate 68. The nut 80 is tightened downward on the tightening strip 66 by means of an impact wrench. As a result, the nut 80 is moved downward, thus pressing the tightening strip 66 downward.

Figure 8:
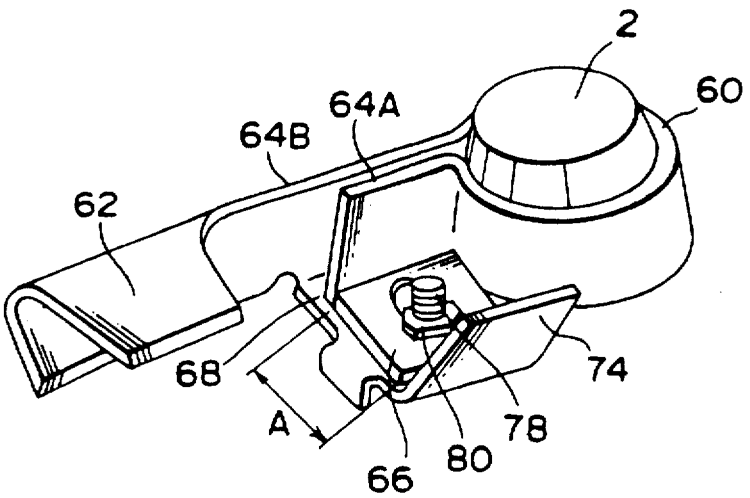
FIG. 8 is a perspective view showing the state in which the battery terminal according to the third embodiment of the present invention has been fixed to the battery post.

With the downward movement of the nut 80, the inclined portion 74 in contact with the tightening strip 66 moving downward functions as a means for moving the tightening strip 66 toward (toward the left) the second tightening plate 64B. As a result, the first tightening plate 64A is pressed and moved toward the second tightening plate 64B. As a result, the electrode-engaging portion 60 moves in the closing direction thereof is pressed against the battery post 2. Thus, the battery terminal 55 is fixed to the battery post 2 as shown in FIG. 8.

As apparent from the foregoing description, in the battery terminal according to the present invention, the nut is tightened downward on the bolt vertically disposed. The elongated groove is moved along the bolt so as to move the tightening strip downward along the inclined portion. In this manner, the tightening force acting downward is divided int the force acting in the direction in which the first tightening plate moves toward the second tightening plate and the force acting in the downward direction. That is, the electrode-engaging portion of the battery terminal can be pressed securely against the battery post and fixed thereto by tightening the nut downward on the bolt.

The nut can be tightened downward on the bolt not horizontally but vertically. Therefore, the battery terminal can be installed on the battery post with a high efficiency. In addition, the impact wrench does not interfere with other parts in installing the battery terminal on the battery post and thus a short circuit can be prevented from occurring. Further, the battery terminal can be reliably fixed to the battery post.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a battery terminal including first and second tightening plates continuous with an open free end of an annular electrode-engaging portion into which a battery post is inserted; and an electric wire-connecting portion continuous with the first tightening plate or the second tightening plate or the electrode-engaging portion, in which the first tightening plate is moved toward the second tightening plate to close the free end of the electrode-engaging portion so that the battery terminal is fixed to the battery post, the battery terminal comprising;

- a tightening strip disposed above the second tightening plate formed on the first tightening plate integrally or continuously therewith;
- an elongated groove formed on the tightening strip in the direction in which the first tightening plate is moved toward the second tightening plate;
- a sliding contact portion formed at an end of the tightening strip in the longitudinal direction of the elongated groove;
- a tightening substrate formed integrally with the second tightening plate;
- a bolt installed upward on the tightening substrate through the elongated groove; and
- an inclined portion along which the sliding contact portion slides formed integrally with the tightening substrate,
- whereby a nut is tightened downward on the bolt to move the sliding contact portion downward along the inclined portion so that the first tightening plate is moved toward the second tightening plate.

2. A battery terminal as defined in claim 1, wherein the first and second tightening plates extend horizontally from the free end of the electrode-engaging portion; the first tightening plate inclines upward from the free end; and the tightening strip disposed above the second tightening plate is formed integrally with an end of the first tightening plate via a stepped portion.

3. A battery terminal as defined in claim 1, wherein the first and second tightening plates each consisting of a flat plate vertically extending are opposed to each other; the tightening substrate extends beyond the lower end of the first tightening plate; the inclined portion opposed to the first tightening plate is formed at the end of the tightening substrate; the tightening strip separate from the first and second tightening plate is disposed above the tightening substrate with an end of the tightening plate in contact with the first tightening plate and the other end thereof in contact with the inclined portion; and the nut is tightened on the bolt projecting upward through the tightening substrate and the elongated groove formed on the tightening strip.

4. A battery terminal as defined in claim 1, wherein the bolt is installed on the tightening substrate by inserting the bolt upward through a bolt opening formed on the tightening substrate so as to lock the head of the bolt on the lower side of the tightening substrate.

* * * * *

UNITED STATES PATENT AND TRADEMARK OFFICE

CERTIFICATE OF CORRECTION

PATENT NO. : 5,290,646 Page 1 of 2

DATED : March 1, 1994

INVENTOR(S) : T. ASAO et al.

It is certified that error appears in the above-indentified patent and that said Letters Patent is hereby corrected as shown below:

Column 1, line 21, change "room" to ---compartment---.
Column 1, line 23, change "projections" to ---projection--.
Column 1, line 57, change "downward In" to ---downward. In---.
Column 1, line 67, change "electrode en-" to ---electrode-en- ---

Column 3, line 23, change "bolt vertically disposed" to ---vertically disposed bolt---.
Column 4, line 51, change "horizontally" to ---horizontal---.
Column 7, line 58, change "thereof is" to ---thereof and is---.
Column 8, line 27 (claim 1, line 5), change "with the" to ---with at least one of the---.

UNITED STATES PATENT AND TRADEMARK OFFICE
CERTIFICATE OF CORRECTION

PATENT NO. : 5,290,646

DATED : March 1, 1994

INVENTOR(S) : T. ASAO et al.

It is certified that error appears in the above-indentified patent and that said Letters Patent is hereby corrected as shown below:

Column 8, line 27 (claim 1, line 5), change "plate or the" to ---plate, the---.

Column 8, line 28 (claim 1, line 6), change "or" to ---and---.

Column 8, line 35 (claim 1, line 13), change "plate formed" to ---plate and being formed---.

Column 8, line 48 (claim 1, line 26), change "slides formed" to ---slides and being formed---.

Signed and Sealed this

Fourteenth Day of March, 1995

Attest:

Bruce Lehman

BRUCE LEHMAN

*Attesting Officer*

*Commissioner of Patents and Trademarks*